US006685593B1

United States Patent
Meier-Burkamp et al.

(10) Patent No.: US 6,685,593 B1
(45) Date of Patent: Feb. 3, 2004

(54) HYDRODYNAMIC, MECHANICAL MULTI-SPEED COMPOUND TRANSMISSION

(75) Inventors: Gerhard Meier-Burkamp, Heidenheim (DE); Franz Hertrich, Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 09/673,539

(22) PCT Filed: Feb. 18, 2000

(86) PCT No.: PCT/EP00/01371
§ 371 (c)(1),
(2), (4) Date: Dec. 7, 2000

(87) PCT Pub. No.: WO00/49312
PCT Pub. Date: Aug. 24, 2000

(30) Foreign Application Priority Data

Feb. 19, 1999  (DE) ......................................... 199 07 037

(51) Int. Cl.$^7$ ............................................. F16H 47/08
(52) U.S. Cl. .............................. 475/35; 475/43; 475/44
(58) Field of Search ............................... 475/35, 43, 44

(56) References Cited

U.S. PATENT DOCUMENTS

| 2,875,643 A | * | 3/1959 | Kelley ......................... 475/43 |
| 3,024,668 A | * | 3/1962 | Kronogard et al. ........... 475/35 |
| 3,030,824 A | * | 4/1962 | Moore .......................... 475/34 |

(List continued on next page.)

FOREIGN PATENT DOCUMENTS

| DE | 1 605 988 | 11/1969 | |
| DE | 2521831 A | * 11/1976 | .......... B60K/41/26 |
| DE | 36 04 393 | 8/1986 | ................. 475/291 |
| DE | 3822319 A1 | * 1/1989 | .......... F16H/47/08 |
| DE | 40 27 724 | 4/1991 | |
| DE | 195 30 488 | 2/1996 | |
| FR | 61295 | * 4/1955 | .................. 475/35 |
| GB | 947969 | * 1/1964 | .................. 475/35 |
| GB | 2 023 752 | 1/1980 | |
| GB | 2 292 428 | * 2/1996 | .................. 475/44 |
| JP | 090 79 346 | 3/1997 | |
| JP | 09079346 A | * 3/1997 | .......... F16H/47/08 |

*Primary Examiner*—Trisha D Lewis
(74) *Attorney, Agent, or Firm*—Baker & Daniels (57) ABSTRACT

The invention relates to a hydrodynamic-mechanical multi-speed compound transmission comprising a transmission input shaft (E) and an output. Said transmission contains a hydrodynamic transmission part (2) having a hydrodynamic speed/torque converter (3), and contains a mechanical transmission part (4) connected downstream from said hydrodynamic transmission part (2) in a spatial manner relative to the transmission input shaft (E). The inventive transmission also comprises at least one speed/torque converter device (5). The mechanical speed/torque converter (3) has at least two planetary gear trains a first planetary gear train (7) and a second planetary gear train (8) each comprising at least one sun gear, a ring gear, planetary gears, and a connecting element, whereby the planetary gear trains are designed and arranged such that an element of the first planetary gear train and of the second planetary gear train can be coupled at least indirectly to the transmission input shaft (E) or to an element of the hydrodynamic speed/torque converter (3), and an additional second element of the planetary gear train (7) is coupled in a rotationally fixed manner to another second element of the second planetary gear train (8). This coupling forms the output of the mechanical speed/torque converter (3), whereby the second element of the first planetary gear train and the second element of the second planetary gear train are each formed by the connecting element. The invention is characterized by the following features: The hydrodynamic speed/torque converter (3) is of the single-stage and two-phase type and; the stator of the hydrodynamic speed/torque converter is coupled to the first planetary gearing of the mechanical speed/torque converter via a free-wheel.

15 Claims, 3 Drawing Sheets

U.S. PATENT DOCUMENTS

| | | | | |
|---|---|---|---|---|
| 3,398,604 A | * | 8/1968 | Hause | 475/44 |
| 3,440,901 A | * | 4/1969 | Chambers | 475/35 |
| 3,772,939 A | * | 11/1973 | Hause | 475/46 |
| 4,191,072 A | * | 3/1980 | Ehrlinger et al. | 475/268 |
| 4,468,987 A | * | 9/1984 | Miller | 477/127 |
| 4,497,219 A | * | 2/1985 | Elsner | 475/113 |
| 4,817,462 A | | 4/1989 | Dach et al. | 74/740 |
| 4,823,641 A | * | 4/1989 | Kuhn et al. | 475/277 |
| 4,964,843 A | * | 10/1990 | Wahl | 475/34 |
| 5,122,104 A | | 6/1992 | Ohkubo | 475/291 |
| 5,711,735 A | | 1/1998 | Park | 475/44 |
| 5,857,934 A | * | 1/1999 | Ohkubo | 475/44 |
| 6,231,467 B1 | * | 5/2001 | Korner et al. | 475/113 |
| 6,561,938 B1 | * | 5/2003 | Korner et al. | 475/59 |

* cited by examiner

| Gear | Clutch | | Brake | | | | i |
| --- | --- | --- | --- | --- | --- | --- | --- |
| | K1 | K2 | B1 | B2 | B3 | B4 | |
| 1. | — | O | — | — | O | — | 3,08 |
| 2. | — | — | — | — | O | O | 2,39 |
| 3. | — | O | O | — | — | — | 1,67 |
| 4. | — | — | O | — | — | O | 1,29 |
| 5. | O | O | — | — | — | — | 1,00 |
| 6. | O | — | — | — | — | O | 0,78 |
| R | — | O | — | O | — | — | −1,50 |

— = Open
O = Set

Fig.3

HYDRODYNAMIC, MECHANICAL MULTI-SPEED COMPOUND TRANSMISSION

The invention concerns a hydrodynamic mechanical multi-speed compound transmission.

Hydrodynamic mechanical multi-speed compound transmissions, consisting of a hydrodynamic speed/torque converter and a mechanical transmission part, are known in a variety of types. The publication DE 38 04 393 C2 identifies a hydrodynamic multi-speed compound transmission, consisting of a torque converter and a gearbox in series. The gearbox contains two planetary gear trains, where the planet carriers of both planetary gear trains are mutually linked and form the output side of the gearbox. The number of required planetary gear members or planetary gear trains (possibly a Ravigneaux set) may be minimized with such an arrangement, and with an appropriate allocation of gears at least three gear levels can be obtained, which are minimized in length, seen in an axial direction. The hydrodynamic speed/torque converter contains an impeller, a turbine wheel and two stators (a first stator and a second stator) where means are designed to enable the linkage of the turbine wheel and the first stator with the mechanical gears by means of a gearbox. In particular, the overall gearbox input shaft may be linked either with the hydrodynamic speed/torque converter and thus via the turbine wheel with the sun gear of one planetary gear train of the mechanical gear part or directly via a so-called bypass clutch with the same. The first stator is linked via a free-wheel with the sun gear of the second planetary gear train of the mechanical gear part. The characteristics of the hydrodynamic speed/torque converter across the whole range of gear ratios and the gear ratio of the mechanical gearbox are modified by switching the path of transmission of the moment emanating from the first stator shaft, namely by the optional use of linkage and/or brake arrangements, which enable either a lock of the first stator shaft or a linkage of the first stator shaft with the turbine wheel shaft and thus with the first sun gear of the first planetary gear train.

The disadvantage of the transmission described in the publication referenced above consists of the relatively high construction requirement, which increases costs, caused among other reasons by the use of a single level, three phase converter and the availability of support for both of its stators. This transmission yielded good results in the low speed range and the potential low speed range conversion, but some improvements are still required in certain uses.

The publication JP 09079346 A contains an example of a hydrodynamic-mechanical multi-speed compound transmission to provide for five gear levels. This contains a hydrodynamic transmission part in the form of a hydrodynamic speed/torque converter with an impeller, a turbine wheel, a stator located between these two and a gearbox switched in series with them. The gearbox likewise contains two planetary gear trains, where the planet carriers of both planetary gear trains are linked with each other and form the output side of the gearbox. The stator is linked to the planetary gear trains via a freewheel. In order to realize the fourth and fifth gears, a speed/torque converter unit in the form of a planetary gear train is integrated between the turbine wheel and the two planetary gear trains of the mechanical gearbox, which converts the moment of the turbine by a gear to the two planetary gear trains. As used in vehicles, the power transfer via the hydrodynamic speed/torque converter is used only during the low speed range and to a certain extent in the first lower gear. In the remainder of the useable range, the power transfer bypasses the hydrodynamic speed/torque converter, usually by means of a bypass clutch. Of significance for the use of a hydrodynamic speed/torque converter during the low speed range are the following advantages of hydrodynamic power transfer: continuous, with torque conversion, elastic, frictionless and vibration-reducing. Specific requirements are imposed on the transfer process in its linkage with motors for various uses during the low speed range. For use in vehicles, a particular behavior, specifically a particular power transfer by the impeller of the hydrodynamic speed/torque converter is desirable. By means of the linkage between the stator of the hydrodynamic speed/torque converter and the planetary gear trains connected by their shafts, the stator will in certain conditions be impelled in the opposite direction between impeller and turbine wheel. While this solution provides a feasible method to supply several gear speeds in a compact size and simultaneously an improved transfer during the low speed range with a particularly improved conversion during acceleration and improved efficiency, this generally does not suffice to meet all requirements of use. Likewise, the linkage of the additional planetary gear train is cumbersome to design and must be considered during design of the gearbox. Particularly if standard speed/torque converter units are used, the placement or linkage of the additional planetary gear train can be difficult.

Thus, the invention is targeted to a further development of the type of transmission described above, so that it may satisfy the existing use requirements, particularly during the low speed range, while maintaining the advantage of low weight and small size. The transmission is intended specifically for use in the drive train of vehicles or other uses, where an essentially load-free ramping of the drive motor is desired in addition to the advantages of hydrodynamic power transfer. A further objective is the reduction of the construction resource requirements and the costs of the transmission.

The hydrodynamic-mechanical multi-speed compound transmission contains a first hydrodynamic transmission part and an additional second mechanical transmission part. The mechanical transmission part contains at least two planetary gear trains for the realization of at least three gear levels, a first planetary gear train and a second planetary gear train, which are designed and constructed in such a way that in each case one set of matching elements of the first planetary gear train and second planetary gear train can be linked at least indirectly with the transmission input shaft or with an element of the hydrodynamic speed/torque converter and where there is in addition a second set of matching elements, where an element of the first planetary gear train has a fixed linkage with an element of the second planetary gear train, and where this linkage forms the output of the mechanical speed/torque converter, which is linked at least indirectly with the output of the transmission. According to the invention, the hydrodynamic speed/torque converter of the first hydrodynamic transmission part is designed as a single-level two-phase hydrodynamic speed/torque converter. This includes an impeller, a turbine wheel and a stator. According to this embodiment, only a turbine level is included and the reaction member in the form of a stator rotates permanently or only intermittently. According to the invention, this is solved by connecting the stator via a geared member with a solid support or a freewheel with the first planetary gear train. According to the invention, the turbine wheel of the hydrodynamic speed/torque converter has a fixed linkage with the second planetary gear train, i.e. the linkage does no contain intervening or potentially intervening speed/torque converter units. Likewise, this embodiment reduces the power potentially transferred in the power train by an impeller through twist modification of the fluid flow at the flow from the stator to the impeller, particularly for use in vehicles in order to lower energy consumption of the motor in the low speed range for at least a portion of the low speed range. The twist modification is preferentially generated by powering the stator in the direction of rotation opposite to the rotation of the impeller and the turbine wheel. The resulting increase of conversion and improvement of the efficiency is increased by the absence of intervening gears between the turbine wheel and the second planetary gear train, and thus the theoretically higher speed ratio between stator and turbine wheel, compared to the conventional transmission embodiment according to JP 090793476 A.

The solution according to the invention offers the advantage of using a more cost-effective converter and thus the reduction of total costs for the hydrodynamic-mechanical compound transmission. Because the stator of the converter does not transfer the moment to the fixed shaft, but to the first planetary gear train of the mechanical transmission part, the output torque of the hydrodynamic speed/torque converter is increased. At increasing turbine speed of the hydrodynamic converter, the speed of the stator will increase in the opposite direction. This leads to the result of an increase in the low speed conversion and an improvement of the efficiency at low speeds. The moment acting on the impeller, which can be estimated with the aid of fluid dynamics theory according to the impulse moment equation of fluid dynamics, just as for stationary and non-compressable fluids, $$M_r = M \times \Delta(rc_r)$$

will be reduced. The size of the moment depends on the mass flow flowing through the impeller in a given length of time $M = \varsigma \times V$, where $\varsigma$ designates the density of the fluid in use and V the mass volume, and the difference of the products of the radius r and the circumference component c of the absolute fluid velocity at the inflow and outflow of the impeller in question. Any modification of the inflow and outflow direction on the impeller in question will therefore also modify the moment acting on this impeller. Given the fact that the sum of all moments in a closed system must always equal Zero, these forces will automatically adjust to again satisfy the equilibrium conditions. The following variables are essential core variables of the hydrodynamic energy transfer system, i.e. of a hydrodynamic speed/torque converter:

Input or pump moment $M\rho$

Output or turbine moment $M\tau$

Input or pump speed $n\rho$

Output or turbine speed $n\tau$

Efficiency $\eta$

The input power of a pump is determined by the product of the input pump moment $M\rho$ and the acceleration of circulation $\omega$. Given the opposite rotation of the stator to the rotation between impeller and turbine wheel, the fluid flow will be twisted at the point of flow from the stator to the impeller, which is the reason for the modification of the output transfer behavior of the impeller. In addition, conversion at low speeds is increased with this solution, just as for other converter types, but where is critical that the output torque at the turbine wheel remains unchanged compared to conventional solutions, where this effect is obtained through the simultaneous presence of the reduction of the moment acting on the impeller and an increased conversion at low speeds. This makes it possible to reduce the load on the propulsion motor significantly, while maintaining the level of the output torque, even if the corresponding high moment at low speeds is still desired. In terms of the dimensionless efficiency parameter $\lambda$ for a hydrodynamic speed/torque converter with a stator, which according to this invention turns in the opposite direction, the load on the propulsion motor varies with the speed of the turbine, and thus, depending on the characteristics, to a different propulsion speed or to a different propulsion moment.

Because the relationship of the torque moment transfer for any given status of the fluid transmission, i.e. for specific values for output and input speed, can be described in a diagram as a quadratic and in the case of power input as a cubic parabola, parabolas with varying slopes result for the torque or power input of the hydrodynamic speed/torque converter for alternative values of input and output speeds.

These curves are then superimposed on the characteristic curve of the motor, so that the intersections of the characteristic curve of the motor, particularly where a combustion engine is used in the motor, with the characteristic curve of the hydrodynamic speed/torque converter will identify the current status of the motor and the converter and their interaction. Whereas an increase in pump speed leads to a reduction of the transferable moment in the case of a conventional hydrodynamic speed/torque converter, the embodiment according to the invention will have a substantially different characteristic curve, where the transferable moment at the impeller is lowered if the ratio of pump speed to turbine speed is below a set value, but where it reverts at higher ratios and conforms to the conventional case.

The preferred embodiment has a linkage of the two planetary gear trains (first planetary gear train and second planetary gear train) of the gear elements in such a way that gear elements of identical types are linked to each other. Here the gear element of the first planetary gear train, which is firmly linked with a gear element of the second planetary gear train, will in each case consists of the planet carrier of the corresponding planetary gear train. The two sun gears of the individual planetary gear trains (first planetary gear train and second planetary gear train) form the inputs to the mechanical speed/torque converter. Here the first input, which is linked to the sun gear of the first planetary gear train, is linked via a freewheel to the stator of the hydrodynamic speed/torque converter. The sun gear of the second planetary gear train is preferentially linked to the turbine wheel shaft, which may be linked via either the hydrodynamic speed/torque converter or via the bypass clutch with the transmission input shaft. The output of the mechanical speed/torque converter can be linked either directly to the output of the transmission or to a further mechanical speed/torque converter in the form of a mechanical overdrive, which is linked in turn with the output or the transmission output shaft.

To realize the various gears, shift arrangements are designed in the form of brake units and clutch units, which are best built with multiple-disk clutches. The various shift arrangements must be used in accordance with the desired gear and the associated gear ratio. This is best designed with a transmission valve.

A first brake arrangement serves to lock the stator shaft and thus the sun gear of the first planetary gear train. A second brake arrangement serves to lock the annulus of the first planetary gear train; a third brake arrangement serves to lock the annulus of the second planetary gear train of the mechanical speed/torque converter. A further fourth brake arrangement serves to lock the sun gear of the overdrive. A first clutch element serves to assure a rotationally solid connection of the sun gear of the first planetary gear train and the sun gear of the second planetary gear train.

Placing the overdrive in the flow of power from the transmission input shaft to the transmission output shaft in a spatial sense behind the mechanical speed/torque converter makes it feasible to generate secondary power outputs. The mere placement of the mechanical overdrive behind the mechanical speed/torque converter forms the first basic configuration, which is characterized by the presence of a multi-speed transmission, specifically a six speed transmission with a simultaneous shortening of the required design space, specifically the design space compared to the basic transmission (3 speed transmission). The overdrive is best designed likewise in the form of a simple planetary gear train, where only one shift element in the form of the fourth brake arrangement is included, which serves to lock the sun gear. Otherwise, the shaft of the mechanical overdrive is linked to the shaft of the mechanical speed/torque converter. Thus it is possible to have three speeds without using a shift element of the overdrive, because the shaft of the overdrive rotates at the same speed as the output of the mechanical speed/torque converter. The output of the overdrive consists of the annulus, which is linked with other speed/torque-transferring elements, such as a spur gear or, depending on the shape of the cogs of the annulus, also a bevel gear. The resulting gear layout must be considered in the layout of the transmission.

Figure 1:
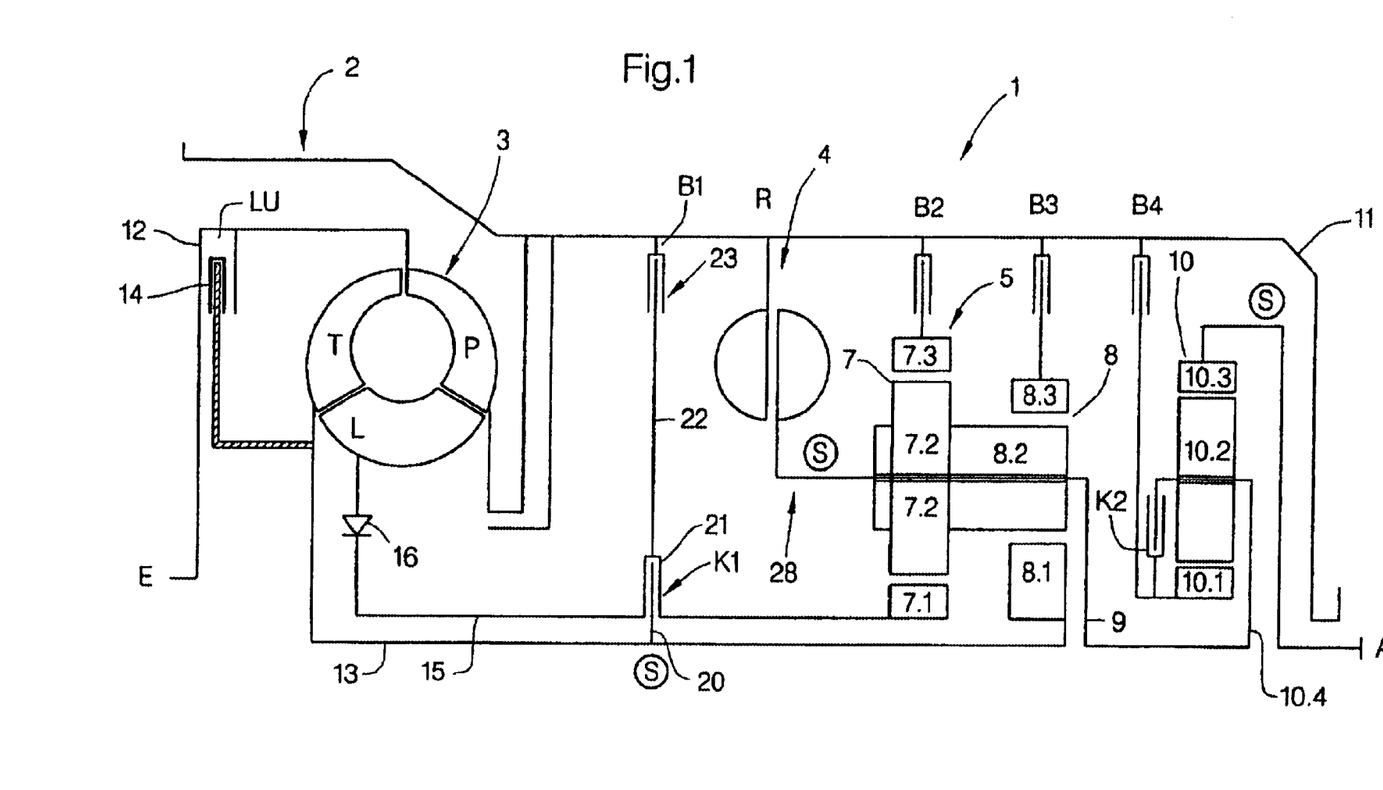
FIG. 1 shows a simplified schematic of the transmission according to the invention.

The solution according to the invention is described below by means of Figures, consisting of the following:

FIG. 1 shows an axial cut of the transmission according to the invention in a simplified schematic. The transmission is designed as a hydrodynamic-mechanical compound transmission 1.

The hydrodynamic-mechanical compound transmission 1 contains the first hydrodynamic transmission part 2 in the form of a hydrodynamic speed/torque converter 3 and a second mechanical transmission part 4. The mechanical transmission part 4 contains a mechanical speed/torque converter 5 and a group train placed behind part 4 in the flow of power, if engaged. The mechanical speed/torque converter 5 is designed as a modified Ravigneaux planetary gear train. It includes the first planetary gear train 7 and a second planetary gear train 8, which share a common planet carrier 9. This forms a linkage between a gear element of the first and the second planetary gear train. The first planetary gear train 7 contains a sun gear 7.1, planet wheels 7.2 and an annulus 7.3. The second planetary gear train 8 contains a sun gear 8.1, planet wheels 8.2 and an annulus 8.3.

The group train 6 contains at least one planetary gear train 10, which consists of a sun gear 10.1, planet wheels 10.2, an annulus 10.3 and a shaft 10.4. The hydrodynamic speed/ torque converter 3 has a single level and two phases in this invention. This means that it can be used only in a single turbine level. The hydrodynamic speed/torque converter 3 contains a turbine wheel T, an impeller P and a stator L.

The impeller P is connected to a transmission input shaft E, which may be connected to at least one motor that serves as the source of power, preferably to the flywheel 12 of a combustion motor, in such a way that the power is transferred from flywheel 12 to the impeller P. The turbine wheel T has a solid connection with the turbine wheel shaft 13. The hydrodynamic speed/torque converter 3 is used for power transfer only in the lower gear levels, preferably only at low speeds, in order to utilize the advantages of the hydrodynamic torque transfer with a bypass clutch, while simultaneously overcoming its disadvantages. The advantages are the following:

Automatic continuous adjustment of the relationship between the input and output speeds according to the load on the output side.

Availability of the maximum torque for high acceleration at low speeds

Possibility of heat reduction by external or surface cooling

Separation of the hydrodynamic speed/torque converter from the output side, particularly for vehicles with low motor speeds and transfer of a small residual moment, so that it is no longer possible to stall the motor from the output side Power transfer without loss The disadvantage of hydrodynamic power transfer consists primarily of a level of efficiency, which is insufficient to allow use of a hydrodynamic transmission by itself, because the loss ratio, which consists of friction and impact losses, often lowers the transmitted total power to levels below the requirement for use in vehicles. Consequently, the hydrodynamic speed/torque converter is removed from the power transfer process, usually by a bypass. For this purpose, a bypass clutch 14 is included between turbine wheel T and the flywheel 12 or the transmission input shaft.

The stator L is placed between the turbine wheel T and the impeller P and is supported by a free-wheel. Stator L is firmly linked to stator shaft 15, where a free-wheel 16 is designed to be inserted between stator L and stator shaft 15, where the free-wheel transfers a moment to the stator shaft 15, whenever the stator turns in the opposite direction, i.e. in the opposite direction of rotation as turbine wheel T, and which is idle, whenever the stator L turns in the normal direction, i.e. in the same direction of rotation as turbine wheel T. The stator L of the hydrodynamic converter 3 thus exerts power on the stator shaft 15, which is linked to the first planetary gear train 7, and thereby increases the output torque of the converter. As the turbine speed of the hydrodynamic speed/torque converter increases, the speed of the stator L in the opposite direction increases also. In combination with the attached planetary gear trains 7 and 8, this leads to an increase in low speed conversion and to an improvement of the efficiency at low speeds.

The impeller P is firmly linked with the impeller shaft 19, which is attached to the housing 11 by a bearing.

Shift elements are assigned to the various elements of the hydrodynamic speed/torque converter 1 in order to generate the individual gears. A first clutch unit K1 and a first brake unit B1 are inserted between the hydrodynamic transmission part 2 and the mechanical transmission part 4.

The turbine wheel T and the linked turbine wheel shaft 13 are linked to the sun gear 8.1 of the second planetary gear train 8 of the mechanical speed/torque converter 5. It is best, if the turbine wheel T and the sun gear 8.1 of the second planetary gear train 8 are on the same shaft, here the turbine wheel shaft 13. The turbine wheel shaft 13 also supports the clutch disk 20 of the first clutch K1. The first clutch K1 further has a clutch disk 21, which is linked to the stator shaft 15. In addition, stator L may be linked to the sun gear 7.1 of the first planetary gear train 7 of the mechanical speed/torque converter 5 via the stator shaft 15. The stator shaft 15 is a hollow shaft, which surrounds the turbine wheel shaft 13.

A preferably disk-like element 22 is linked to the clutch disk 21 of the first clutch K1 and forms a single unit with the same, where the first brake B1 may clamp on the external surface 23 of this unit. The first brake B1 serves here to lock the stator L via the stator shaft 15 and/or the first sun gear 7.1 of the first planetary gear train 7 of the mechanical speed/torque converter 5. Additional shift elements, here the shift elements in the form of brakes B2 and B3, are also allocated to the individual planetary gear trains 7 or 8 of the mechanical speed/torque converter 5. In the depicted case, the second brake B2 is intended for the annulus 7.3 of the first planetary gear train and the third brake B3 is intended for the annulus 8.3 of the second planetary gear train 8 of the mechanical speed/torque converter 5. The linkage of the mechanical speed/torque converter 5 with the transmission input shaft E via the hydrodynamic speed/torque converter 3 or its bypass by the bypass clutch 14 is achieved by linkage of the turbine wheel T or the turbine wheel shaft 13 with a first transmission element of the mechanical speed/torque converter 5 and linkage of stator L with an additional second transmission element of the mechanical speed/torque converter 5. The first transmission element of the mechanical speed/torque converter 5 is here the sun gear 8.1 of the second planetary gear train 8. The second transmission element is here the sun gear 7.1 of the first planetary gear train 7. The shafts linked to the two sun gears 7.1 or 8.1, which are here the stator shaft 15 and the turbine wheel shaft 13, act as the input shafts of the mechanical speed/torque converter 5. A further third transmission element is linked to the transmission output shaft A via the group train 6. The third transmission element is planet carrier 9, which is used jointly by planetary gear trains 7 and 8. The third transmission element of the mechanical speed/torque converter 5 is connected with the input, which is formed by the first transmission element of group train 6. Preferably, this connection is made with a solid linkage between the third transmission element of the mechanical speed/torque converter 5 and the first transmission element of group train 6. Both are preferably arranged on a joint connecting shaft '24. The first transmission element of group train 6 consists of its planet carrier 10.4. The second transmission element of group train 6 is firmly connected to the transmission output shaft A of the hydrodynamic-mechanical compound transmission 1. The second transmission element in the depicted case is the annulus 10.3 of the planetary gear train 10 of group train 6. While the mechanical speed/torque converter 5 in combination with the hydrodynamic speed/torque converter 3 serves to generate 3 gears, the combination of the hydrodynamic speed/torque converter 3, the mechanical speed/torque converter 5 and group train 6 can generate 6 gears. Towards this end, the group train 6 is provided with an additional clutch unit, here the second clutch K2 and an additional brake, here the fourth brake B4. The fourth brake serves to lock the sun gear 10.1 of group train 6. The second clutch K2 enables the fixed linkage between the planet carrier 10.4 and the sun gear 10.1 of planetary gear train 10 of group train 6.

In addition, a hydrodynamic retarder R is designed to be included in transmission 1, which acts at least indirectly upon the transmission output shaft A. The hydrodynamic retarder R is spatially located between the hydrodynamic speed/torque converter 3 and the mechanical speed/torque converter 5. The hydrodynamic retarder R acts on transmission output shaft A via the mechanical speed/torque converter 5 and the overdrive 6. The integration of the hydrodynamic retarder R in physical proximity of the hydrodynamic speed/torque converter 3 makes it possible that both hydrodynamic components can be serviced by a joint fluid supply system, which significantly reduces the requirements for hydraulic fluid supply. This particularly releases space that would otherwise be required for individual supply lines to other components.

Figure 2:
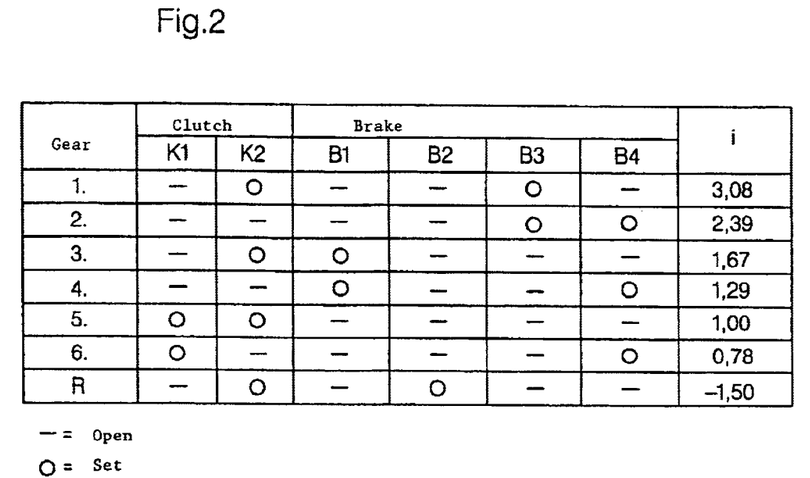
FIG. 2 shows the shift scheme for a possible functional embodiment of the transmission shown in FIG. 1.

FIG. 2 shows a potential wiring diagram for one possible functional embodiment of the transmission described in FIG. 1.

The third brake B3 is engaged for the first gear, while the other brake elements and clutches in the mechanical speed/torque converter 5, the second brake B2, the first brake B1 as well as the first clutch element K1 are not engaged or are extended. Thus only the annulus 8.3 of the second planetary gear train is connected to the housing 11, while the other planetary gear trains of the mechanical speed/torque converter 5 are linked to each other and form a single unit. Within the range of speed controlled by the first gear, the stator L acts with reverse moment on the member via the speed/torque converter 5 and increases the output torque. The first clutch K2 is engaged in group train 6 for this gear. Consequently, the annulus 10.3 turns at the same speed as the member 10.4, which implies a gear ration in the group train of 1. The shift into second gear is accomplished by releasing the second clutch K2 and engaging the fourth brake B4. At increasing speed, the system automatically switches into third gear. In this case, the third brake is disengaged and the first brake B1 is set. Furthermore, the first clutch K1 as well as the fourth brake B4 are not in use and the second clutch K2 is set. Thus, the stator shaft 15 as well as the sun gear 7.1 of the first planetary gear train of the mechanical speed/torque converter 5 are connected to the housing 11. If the converter bypass clutch is not used, the first gear will have very high traction, because the stator torque will act as an input torque via the member of the planetary gear train. The torque of the hydrodynamic speed/torque converter 3 will therefore develop higher traction in the first and second gear. The power transfer from the mechanical speed/torque converter 5 to the output shaft A of the hydrodynamic-mechanical compound transmission 1 is accomplished with additional speed/torque conversion via group train 6. The shift into fourth gear releases the fourth brake B4 and engages the second clutch K2. The shift units in the basic transmission remain in the same position as for third gear. With additional speed increases, the fifth gear is engaged. In fifth gear, only the first clutch K1 and the second clutch K2 are engaged. The turbine wheel shaft 13 turns in this instance in the same direction as the stator shaft 15. In sixth gear, the second clutch K2 is disengaged and the fourth brake is engaged. In gear 6, power is transferred directly from the transmission input shaft E to the turbine wheel shaft 13 and thus to the mechanical speed/torque converter 5.

Usually, higher speed causes the bypass clutch 14 to bypass the hydrodynamic speed/torque converter 3. Power is then transferred directly from the transmission input shaft E to the turbine wheel shaft 13 and thus to the mechanical speed/torque converter 5. The hydrodynamic speed/torque converter thus only comes into play in first and second gear.

The three basic gears are thus split into two sets of gears by the application of group train 6, leading finally to a multi-speed transmission, in this case a six-gear transmission. This is done specifically by the alternating use of the shift units in group train 6. In each of the first gears of each level, the power output from the mechanical speed/torque converter 5 is transferred to its output shaft with a gear ratio of 1. In the second gear level, which inevitably succeeds the first gear level, the current speed is transmitted from the output of the mechanical speed/torque converter 5 via group train 6.

Figure 3:
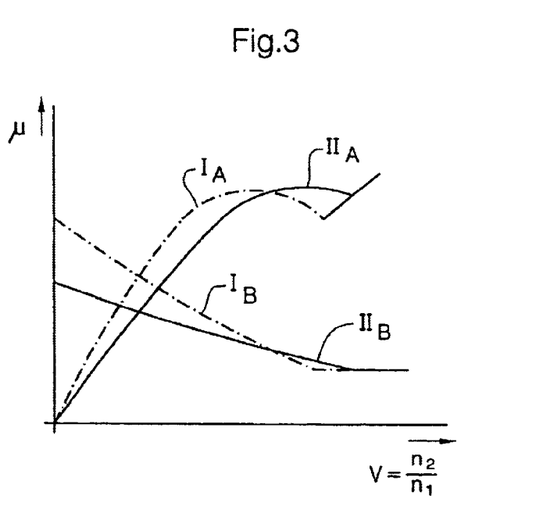
FIG. 3 shows the comparison of converter characteristic curves for the transmission according to the invention.

FIG. 3 uses a diagram to illustrate the transfer activities of a hydrodynamic-mechanical compound transmission 1 designed in accordance with this invention in comparison to a transmission with a hydrodynamic speed/torque converter with two stators in the low speed range. Thus, the efficiency and the conversion via the speed relationship are shown in a diagram. The corresponding characteristic curves for a single-level two-phase hydrodynamic converter, used in a transmission in accordance with this invention, are labeled as $I_A$ for efficiency and $I_B$ for conversion, whereas the efficiency and conversion curves for a conventional transmission are labeled $II_A$ and $II_B$, respectively. This shows that the solution described in the invention can work in conjunction with the mechanical transmission part to achieve a better low speed conversion and a higher efficiency.

Figure 4:
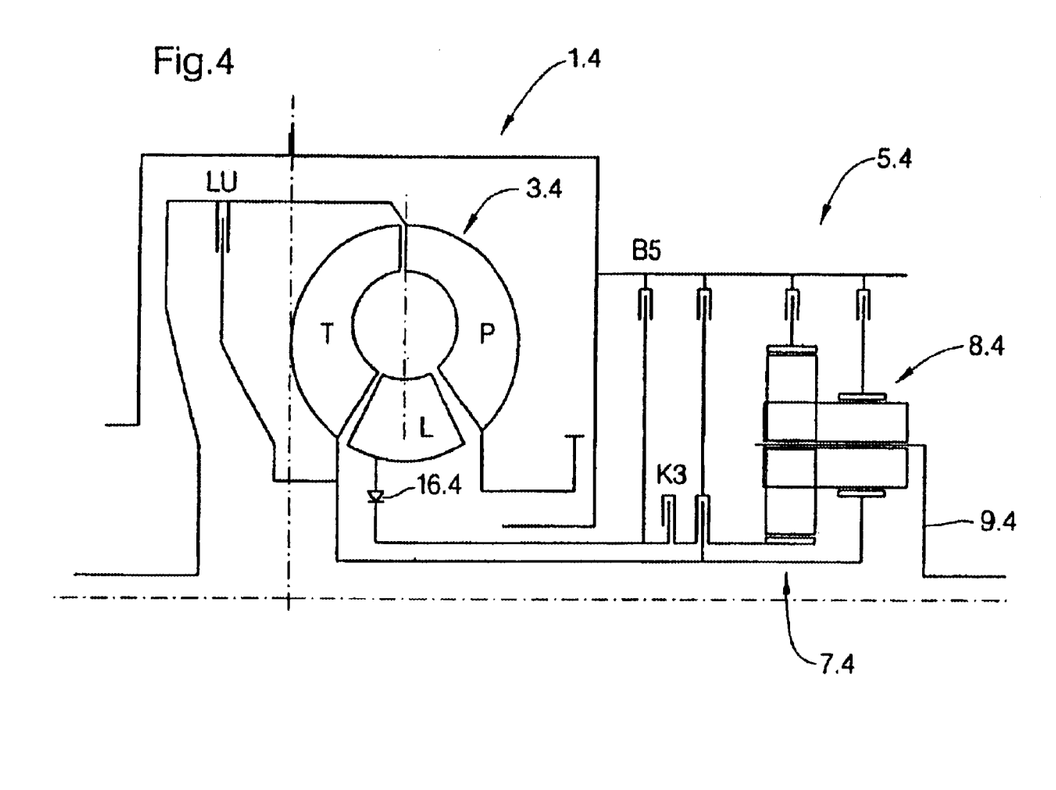
FIG. 4 shows details of a transmission component according to the invention from FIG. 1 with an additional potential linkage of the stator to the housing.

FIG. 4 shows an enlargement of another embodiment of a transmission 1.4. Only the first hydrodynamic transmission part 2.4 and the planetary gear trains 7.4 and 8.4 of the mechanical speed/torque converter 5.4 of the second mechanical transmission part 4.4, which share the member 9.4, are shown here. The overdrive is not shown. The basic structure of the hydrodynamic speed/torque converter 3.4 and the speed/torque converter 5.4 is identical to that described in FIG. 1, and identical reference marks are used for the same components. The linkage of the first element 8.41 of the second planetary gear train 8.4 with the turbine wheel T of the hydrodynamic speed/torque converter 3.4 is done directly, i.e. without use of additional speed/torque converters. To achieve the multiple gears, the output of the mechanical speed/torque converter 5.4, which consists of the jointly used member 9.1, is linked to another overdrive 10, which is not shown here. The hydrodynamic speed/torque converter 3.4 has likewise a single level and two phases, i.e. the hydrodynamic speed/torque converter 3.4 has an impeller P, a turbine wheel T and a stator L between the impeller P and the turbine wheel T. By the linkage of stator L with a transmission element of the first planetary gear train 7.4, specifically the sun gear 7.41 of the first planetary gear train 7.4, the stator L is powered in the opposite direction as the impeller and the turbine wheel, if the free-wheel 16.6 is not used. The stator L has been equipped here with a brake B5 and a clutch K3. The use of these components gives the advantage of an optional de-coupling of the start from the mechanical speed/torque converter 5.4 and the support on the housing.

What is claimed is:

1. A hydrodynamic-mechanical multi-speed compound transmission comprising:
    a transmission input shaft (E) and an output (A);
    a hydrodynamic transmission part (2) comprising a hydrodynamic speed/torque converter (3) and a mechanical transmission part (4) connected behind said hydrodynamic speed/torque converter (3) relative to said input shaft;
    said mechanical transmission part comprising at least a first mechanical speed/torque converter (5) and a second mechanical speed/torque converter (6) linked to an output of said first mechanical speed/torque converter (5) and having an output forming said output (A) of the hydrodynamic-mechanical multi-speed compound transmission;
    said first mechanical speed/torque converter including at least a first planetary gear train (7) and at least a second planetary gear train (8), each of said planetary gear trains including at least one sun gear, an annulus, planet gears and a member;
    a first element of said first planetary gear train and a corresponding first element of said second planetary gear train being optionally linked at least indirectly with said transmission input shaft (E) or with an element of said hydrodynamic speed/torque converter (3);
    a second element of said first planetary gear train being firmly linked with a second element of said second planetary gear train to form a linkage, said linkage forming said output of said first mechanical speed/torque converter;
    said hydrodynamic speed/torque converter (3) having only one turbine stage and having two phases;
    said hydrodynamic speed/torque converter including a stator (L) linked with the first planetary gear train (7) via a free-wheel (16) and a turbine wheel (T) firmly linked with said second planetary gear train (8); and
    a clutch (K1) optionally linking the first element of said first planetary gear train with the first element of said second planetary gear train;
    whereby firm connections of linkages of the first element of the first and/or secondary planetary gear trains with said transmission input shaft (E) and said hydrodynamic speed/torque converter (3) can be achieved.

2. Hydrodynamic-mechanical multi-speed compound transmission according to claim 1, characterized by a design where the first element of the first planetary gear train (7) consists essentially of the sun gear (7.1) of the first planetary gear train (7) and the first element of the second planetary gear train (8) consists essentially of the sun gear (8.1) of the second planetary gear train (8).

3. Hydrodynamic-mechanical multi-speed compound transmission according to claim 1, characterized by a design where the second mechanical speed/torque converter (6) is a group train for the first mechanical speed/torque converter (5) and is optionally linked to the output of said first converter (5).

4. Hydrodynamic-mechanical multi-speed compound transmission according to claim 3, characterized by a design where the second speed/torque converter (6) contains at least one planetary gear train (10), containing a sun gear, an annulus, planet gears, and a member.

5. Hydrodynamic-mechanical multi-speed compound transmission according to claim 1, characterized by a design where means are incorporated into the design for the optional linkage of the first element of the second planetary gear train (8) to the turbine wheel (T) and/or the transmission input shaft (E).

6. Hydrodynamic-mechanical multi-speed compound transmission according to claim 5, characterized by a design where the means for the optional linkage include a clutch (14) that can be shifted.

7. Hydrodynamic-mechanical multi-speed compound transmission according to claim 1, characterized by a design where the first mechanical speed/torque converter (5) is connected to a multitude of shifting mechanisms (B1, B2, B3, K1) in the form of one or both of clutches and brakes.

8. Hydrodynamic-mechanical multi-speed compound transmission according to claim 7, characterized by a design where a third element (7.3) of the first planetary gear train (7) may be locked by means of a second brake (B2).

9. Hydrodynamic-mechanical multi-speed compound transmission according to claim 7, characterized by a design where a third element (8.3) of the second planetary gear train (8) may be locked by means of a third brake (B3).

10. Hydrodynamic-mechanical multi-speed compound transmission according to claim 7, characterized by a design where the first element of the first planetary gear train (7) may be locked by means of a first brake (B1).

11. Hydrodynamic-mechanical multi-speed compound transmission according to claim 10, characterized by a design where a third element (8.3) of the second planetary gear train (8) may be locked by means of a third brake (B3).

12. Hydrodynamic-mechanical multi-speed compound transmission according to claim 10, characterized by a design where a third element (7.3) of the first planetary gear train (7) may be locked by means of a second brake (B2).

13. Hydrodynamic-mechanical multi-speed compound transmission according to claim 12, characterized by a design where a third element (8.3) of the second planetary gear train (8) may be locked by means of a third brake (B3).

14. Hydrodynamic-mechanical multi-speed compound transmission according to claim 1, characterized by the following characteristics:
   an additional brake (B4) and an additional second clutch (K2) are allocated to a planetary gear train (10) of the second mechanical speed/torque converter (6);
   the brake (B4) may be linked with a sun gear (10.1) of the planetary gear train of said second mechanical speed/torque converter (10);
   the second clutch (K2) serves to link the sun gear (10.1) of said second mechanical speed/torque converter with the planet carrier (10.4) of the associated planetary gear train (10).

15. Hydrodynamic-mechanical multi-speed compound transmission according to claim 1, including a clutch (14) optionally linking the first element of the second planetary gear train (8) to the turbine wheel (T) and/or the transmission input shaft (E).

* * * * *